United States Patent
Nakhla (10) Patent No.: US 7,234,771 B2
(45) Date of Patent: Jun. 26, 2007

(54) CHILD SAFETY SEAT WITH ADJUSTABLE HEAD RESTRAINT

(75) Inventor: Said Nakhla, Clarkston, MI (US)

(73) Assignee: Britax Child Safety, Inc., Charlotte, NC (US)

( * ) Notice: Subject to any disclaimer, the term of this patent is extended or adjusted under 35 U.S.C. 154(b) by 427 days.

(21) Appl. No.: 10/763,532

(22) Filed: Jan. 23, 2004

(65) Prior Publication Data

US 2005/0099044 A1    May 12, 2005

Related U.S. Application Data

(60) Provisional application No. 60/513,789, filed on Oct. 23, 2003.

(51) Int. Cl.
*B60N 2/28* (2006.01)
*B60N 2/42* (2006.01)

(52) U.S. Cl. .............. 297/250.1; 297/219.12; 297/284.9; 297/397; 5/644

(58) Field of Classification Search .......... 297/250.1, 297/284.9, 391, 397, 452.41, 219.12; 5/622, 5/637, 644, 628
See application file for complete search history.

(56) References Cited

U.S. PATENT DOCUMENTS

| 2,589,155 | A |   | 3/1952 | Smith |
| 4,345,347 | A | * | 8/1982 | Kantor ................... 5/644 |
| 4,402,548 | A |   | 9/1983 | Mason |
| 4,589,695 | A | * | 5/1986 | Isono ................ 297/284.9 |
| 5,064,245 | A | * | 11/1991 | Stephens ................ 297/397 |
| 5,248,182 | A |   | 9/1993 | Hittie |
| 5,280,997 | A | * | 1/1994 | Andres et al. ......... 297/284.9 |
| 5,292,176 | A |   | 3/1994 | Artz |
| 5,330,255 | A | * | 7/1994 | Stawicki ................ 297/391 |
| 5,383,711 | A |   | 1/1995 | Houghteling |
| 5,544,378 | A | * | 8/1996 | Chow .................... 5/644 |
| 5,556,169 | A | * | 9/1996 | Parrish et al. ........ 297/452.28 |
| 5,630,651 | A | * | 5/1997 | Fishbane ............... 297/397 |
| 6,047,425 | A | * | 4/2000 | Khazaal ................ 5/644 |
| 6,135,553 | A |   | 10/2000 | Lovie et al. |
| 2003/0226207 | A1 | * | 12/2003 | Lowenthal ................ 5/644 |

FOREIGN PATENT DOCUMENTS

| DE | 3724130 A1 | 2/1989 |
| DE | 101 56 621 C1 | 11/2002 |
| IE | 990136 A | 8/2000 |

OTHER PUBLICATIONS

Storchenmuhle Kollektion '96/97; Storchenmuhle GmbH & Co. KG, 8 pages.

* cited by examiner

*Primary Examiner*—Peter R. Brown
(74) *Attorney, Agent, or Firm*—Adams Evans P.A.

(57) ABSTRACT

A side-protective head restraint pad, pad assembly and safety seat. The restraint pad includes an air bladder with a pump for selectively inflating the air bladder and a release valve for selectively deflating the air bladder, an energy-absorbing component and a comfort component. A flexible enclosure is provided within which the air bladder, energy-absorbing component and comfort component are positioned in overlaid configuration to define a unit. The head restraint pad is adapted for being placed in a seat in lateral alignment with one side of the head of an occupant and inflatable or deflatable as appropriate to restrain the head against injurious lateral movement caused by a side impact relative to the seat.

16 Claims, 9 Drawing Sheets

CHILD SAFETY SEAT WITH ADJUSTABLE HEAD RESTRAINT

This application claims the benefit of the filing date of U.S. Provisional Patent Application No. 60/513,789, filed on Oct. 23, 2003.

TECHNICAL FIELD AND BACKGROUND OF THE INVENTION

This invention relates to safety seats for vehicles. The invention has particular application to the provision of a safety seat for children and for the physically handicapped, and is intended to provide an improved level of protection to the head during side impact vehicle accidents.

During early development the neck of an infant is not strong enough to fully support the head in an upright position. Thus, even in a semi-reclined position the head, if not laterally supported, will fall to one side or the other if not provided with supplemental support.

Side impacts have the potential to violently accelerate the child's head in one direction and rebound the head in the opposite direction after the much-wider shoulders have been restrained against further movement by contact with the side of the seat. If the lateral head restraint pads are sufficiently far apart substantial additional lateral movement of the head is permitted, with the possibility of injury.

Numerous patents disclose various types of safety seats for young children. It is known to provide a child's safety seat in the form of a molded concave shell having an integrally-formed seat back and seat bottom with padding that provides bilateral and anterior support for the child's body. An example is U.S. Pat. No. 6,135,553. These seats generally maintain the infant in a semi-reclining position.

Children's safety seats of the foregoing type are typically provided in a single size. A child's head grows rapidly during the first year, and the head of a new-born infant is much smaller than that of, for example, a one year-old child, although in both cases the head is relatively heavy in relation to the total body weight.

Some such safety seats do not provide side head restraint pads. Other safety seats provide lateral head restraint pads intended to prevent excessive lateral movement of the head during a side impact. These pads decrease the distance from one interior side of the seat to the other in the region of the head, and are generally designed as a compromise between the varying head sizes of a new-born infant and a child as old as, for example, 15 months. In both such cases it is common for parents to use rolled receiving blankets or cloths placed around the side and rear of the head to form supplemental head restraints to prevent lateral movement of the head in the seat. This is not a desirable practice since, in a crash, the loose padding would not likely remain in place, particularly if the side impact is a secondary impact.

The restraints according to the various embodiments of the invention provide a means of easily and quickly adjusting the space within which the head of the infant is placed, permit customization for a particular infant, accommodate infant growth during one or more use cycles of the safety seat, and enhance protection against the consequences of a side impact.

SUMMARY OF THE INVENTION

Therefore, it is an object to provide a side-protective head restraint pad for use in a child's safety seat.

It is another object of the invention to provide a side-protective head restraint assembly for use in a child's safety seat.

It is another object of the invention to provide a child's safety seat that incorporates a side-protective head restraint pad or assembly.

It is another object of the invention to provide a child's safety seat that includes adjustable pads for providing supplemental lateral support to the head of an infant.

It is another object of the invention to provide a child's safety seat that includes adjustable pads for providing improved protection to the head of an infant during side impact vehicle accidents.

It is another object of the invention to provide a side-protective head restraint pad that includes an air bladder for allowing the lateral thickness of the restraint pad to be increased or decreased for optimal fit by inflating or deflating the air bladder.

It is another object of the invention to provide a side-protective head restraint pad that incorporates several layers of protective materials for optimizing safety, comfort and adjustability.

These and other objects of the present invention are achieved in the preferred embodiments disclosed below by providing a side-protective head restraint pad, including an air bladder positioned adjacent a side wall of a child safety seat in lateral alignment with one side of the head of an occupant and inflatable or deflatable as appropriate to restrain the head against injurious lateral movement caused by a side impact relative to the seat.

According to one preferred embodiment of the invention, a side-protective head restraint pad includes an air bladder, with a pump for selectively inflating the air bladder and a release valve for selectively deflating the air bladder, an energy-absorbing component and a comfort component. A flexible enclosure is provided within which the air bladder, energy-absorbing component and comfort component are positioned in overlaid configuration to define a unit. The head restraint pad is adapted for being placed in a seat in lateral alignment with one side of the head of an occupant and inflatable or deflatable as appropriate to restrain the head against injurious lateral movement caused by a side impact relative to the seat.

According to one preferred embodiment of the invention, the energy-absorbing component is sandwiched between the air bladder and the comfort component, a comfort component side of the head restraint pad being adapted for being placed adjacent the head of an occupant.

According to another preferred embodiment of the invention, the energy-absorbing component is sandwiched between the air bladder and the comfort component, the comfort component side of the head restraint pad being adapted for being placed in a seat adjacent one side of the head of an occupant, and further wherein the energy absorbing component is formed of semi-rigid, compressible foam, the comfort component is formed of a soft, compressible foam, and the enclosure is formed of a fabric.

According to yet another preferred embodiment of the invention, the pad includes a stiff, relatively thin support positioned on a side of the air bladder remote from the energy-absorbing component for providing shaping and support to the restraint pad.

According to yet another preferred embodiment of the invention, a head restraint assembly is provided and comprises an air bladder, including a pump for selectively inflating the air bladder and a release valve for selectively deflating the air bladder. An energy-absorbing component and a comfort component is also provided. A flexible enclosure is provided within which the air bladder, energy-absorbing component and comfort component are positioned in overlaid configuration to define a unit. The air bladder, energy-absorbing component, comfort component and enclosure collectively define a pair of head restraining pads for being positioned in a generally U-shaped configuration in a seat with the pair of head restraining pads adjacent opposing sides of the head of the seat occupant, and selectively inflatable and deflatable as appropriate to restrain the head against injurious lateral movement caused by a side impact relative to the seat.

According to yet another preferred embodiment of the invention, the energy-absorbing component is sandwiched between the air bladder and the comfort component, and the comfort component is adapted for being placed nearest the head of the seat occupant.

According to yet another preferred embodiment of the invention, the semi-rigid energy-absorbing component comprises a pair of foam blocks.

According to yet another preferred embodiment of the invention, the foam blocks are downwardly-tapered provide a head restraint assembly that is relatively thick adjacent an cranial portion of the head and relatively less thick adjacent a jaw portion of the head.

According to yet another preferred embodiment of the invention a child safety seat with an adjustable head restraint is provided and comprises a shell defining a generally rigid, concave integral seat bottom and seat back, with seat padding covering the seat bottom and seat back for providing a comfortable seating surface for a seat occupant. Attachment means are carried by the shell for attachment of the shell to a support, such as the seat of a vehicle. A side-protective head restraint assembly is provided for being positioned within the shell, and includes an air bladder, including a pump for selectively inflating the air bladder and a release valve for selectively deflating the air bladder. A flexible enclosure is provided within which the air bladder, an energy-absorbing component and a comfort component are positioned in overlaid configuration to define a unit. The air bladder, energy-absorbing component and comfort component and enclosure collectively define a pair of head restraining pads for being positioned in a generally U-shaped configuration on the seat back with the pair of head restraining pads adjacent opposing sides of the head of the seat occupant, and selectively inflatable and deflatable to restrain injurious lateral movement of the head of the seat occupant caused by a side impact relative to the seat.

According to yet another preferred embodiment of the invention, an attachment component is carried by the pad for attaching the pad to the seat back.

According to yet another preferred embodiment of the invention, the semi-rigid energy-absorbing component comprises a pair of foam blocks.

BRIEF DESCRIPTION OF THE DRAWINGS

Some of the objects of the invention have been set forth above. Other objects and advantages of the invention will appear as the invention proceeds when taken in conjunction with the following drawings, in which.

DETAILED DESCRIPTION OF THE PREFERRED EMBODIMENT AND BEST MODE

Figure 1:
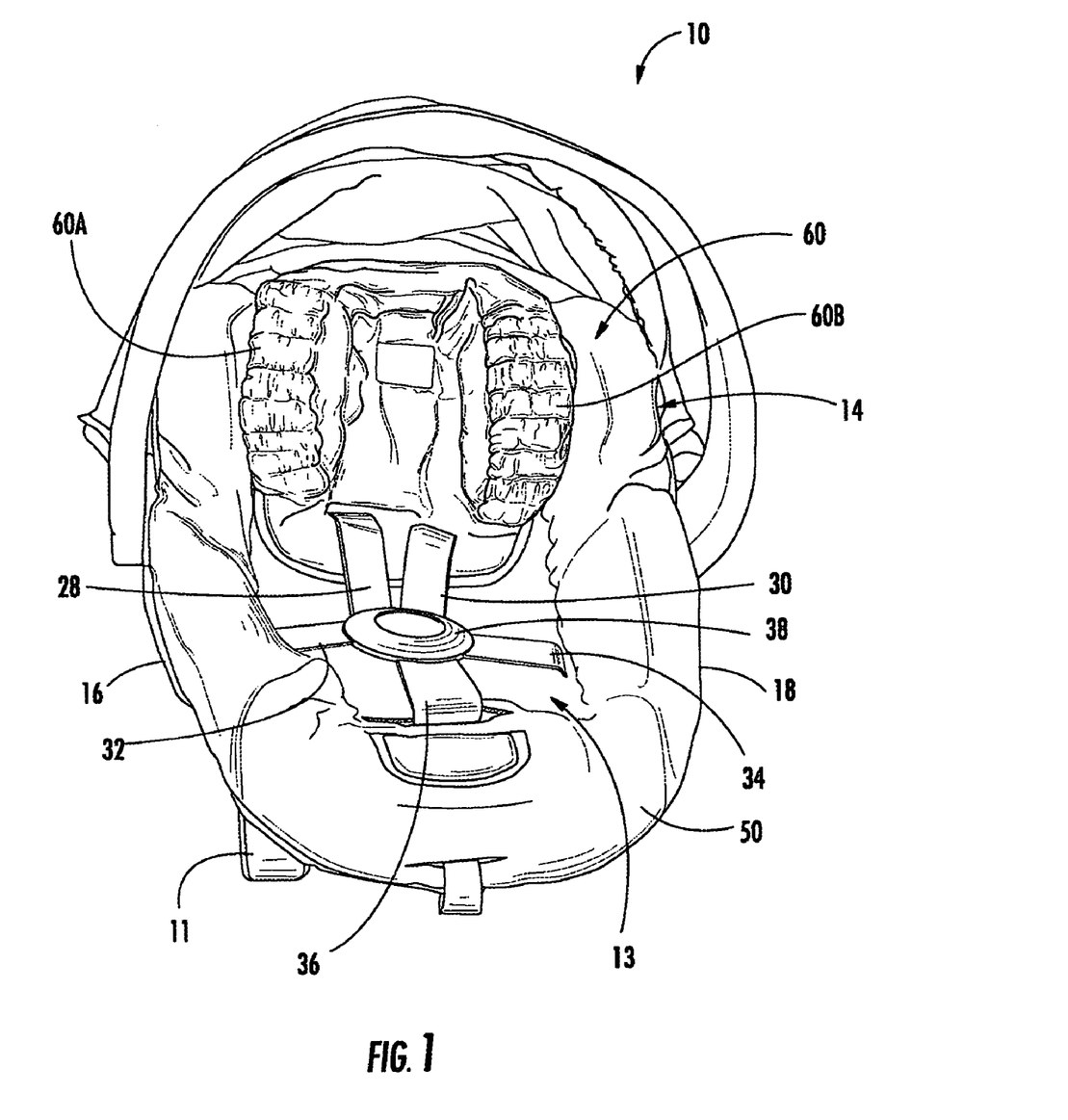
FIG. 1 is a front view of a safety seat.
Figure 2:
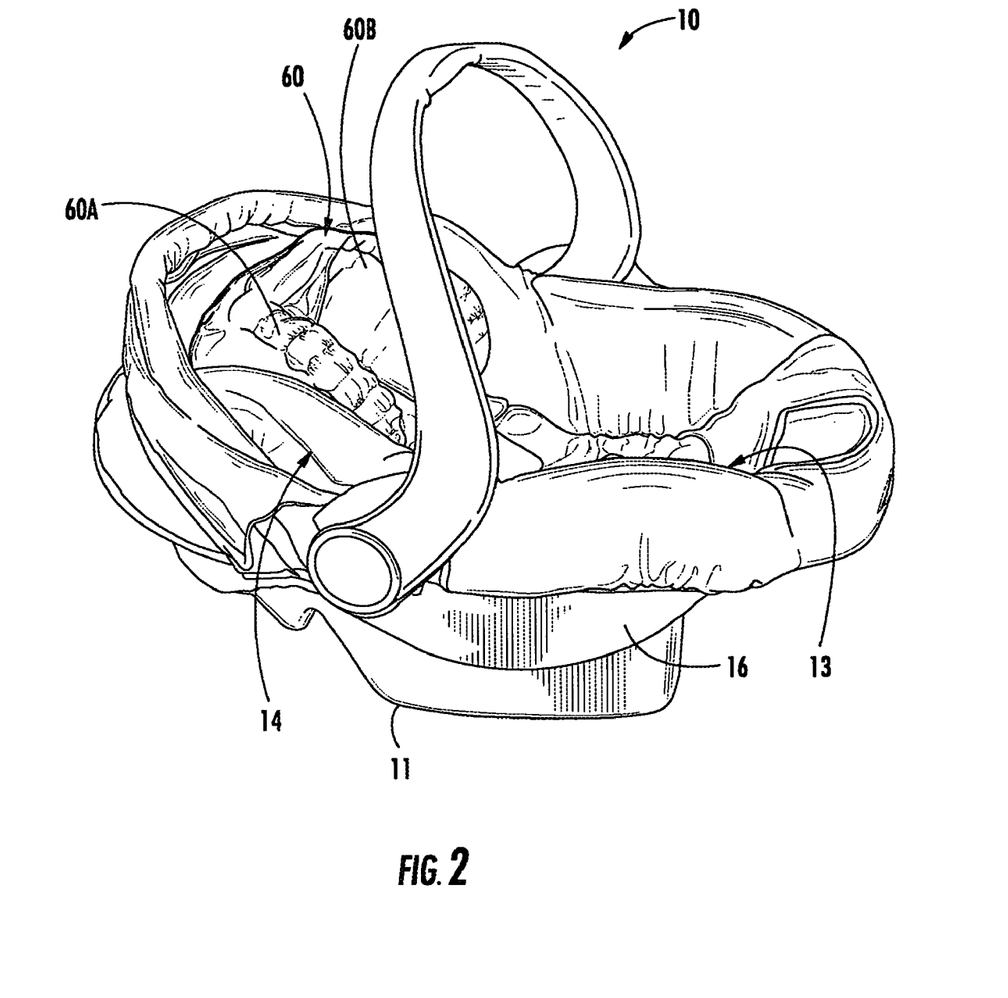
FIG. 2 is a perspective view of the safety seat shown in FIG. 1.

Referring to now to the drawings, a safety seat 10 according to one embodiment of the invention is shown in FIGS. 1 and 2, and comprises a shell 11 molded from a plastic or other suitable material, such as a resin-impregnated glass fiber material.

The shell 11 has a bottom 13, a back 14 (FIG. 1), and two sides 16 and 18. Attached to each of the sides 16 and 18 are upper and lower anchor points for straps (not shown) whereby the seat 10 may be secured to the seat of a vehicle in a known manner.

The seat 10 is fitted with a harness comprising shoulder straps 28 and 30, lap straps 32 and 34 and a crotch strap 36 that are interconnected by a centrally positioned buckle 38. The shoulder straps 28 and 30, lap straps 32 and 34, and crotch strap 36 are fixed through anchor slots formed in the shell 11 in accordance with the prior art.

The inner surface of the shell 11 is covered by a fabric cover 50 which has slots through which the straps 28, 30, 32, 34 and 36 project.

Figure 3:
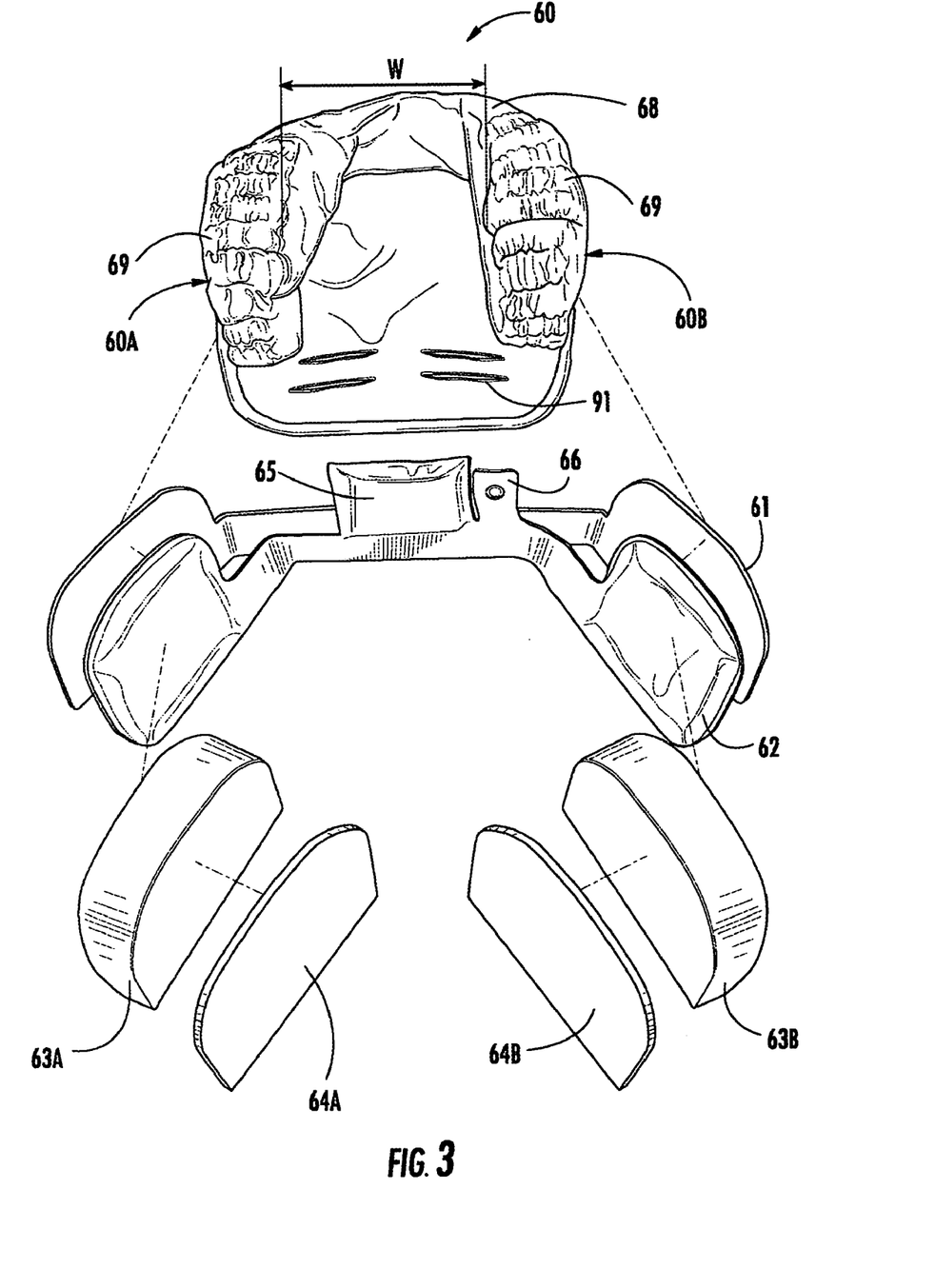
FIG. 3 is a front schematic exploded view of a head restraint assembly according to an embodiment of the invention.

Referring now to FIG. 3, a lateral head restraint pad assembly 60 is shown according to one embodiment of the invention, and comprises a stiff, thin plastic support in the form of a connector bridge 61, an overlaid air bladder 62, wedge-shaped blocks of crushable energy-absorbing foam 63A and 63B, and relatively thin blocks of a resilient "comfort" foam 64A, 64B that is soft to the touch disposed next to the energy-absorbing foam blocks crushable energy-absorbing foam blocks 63A, 63B.

Figure 4:
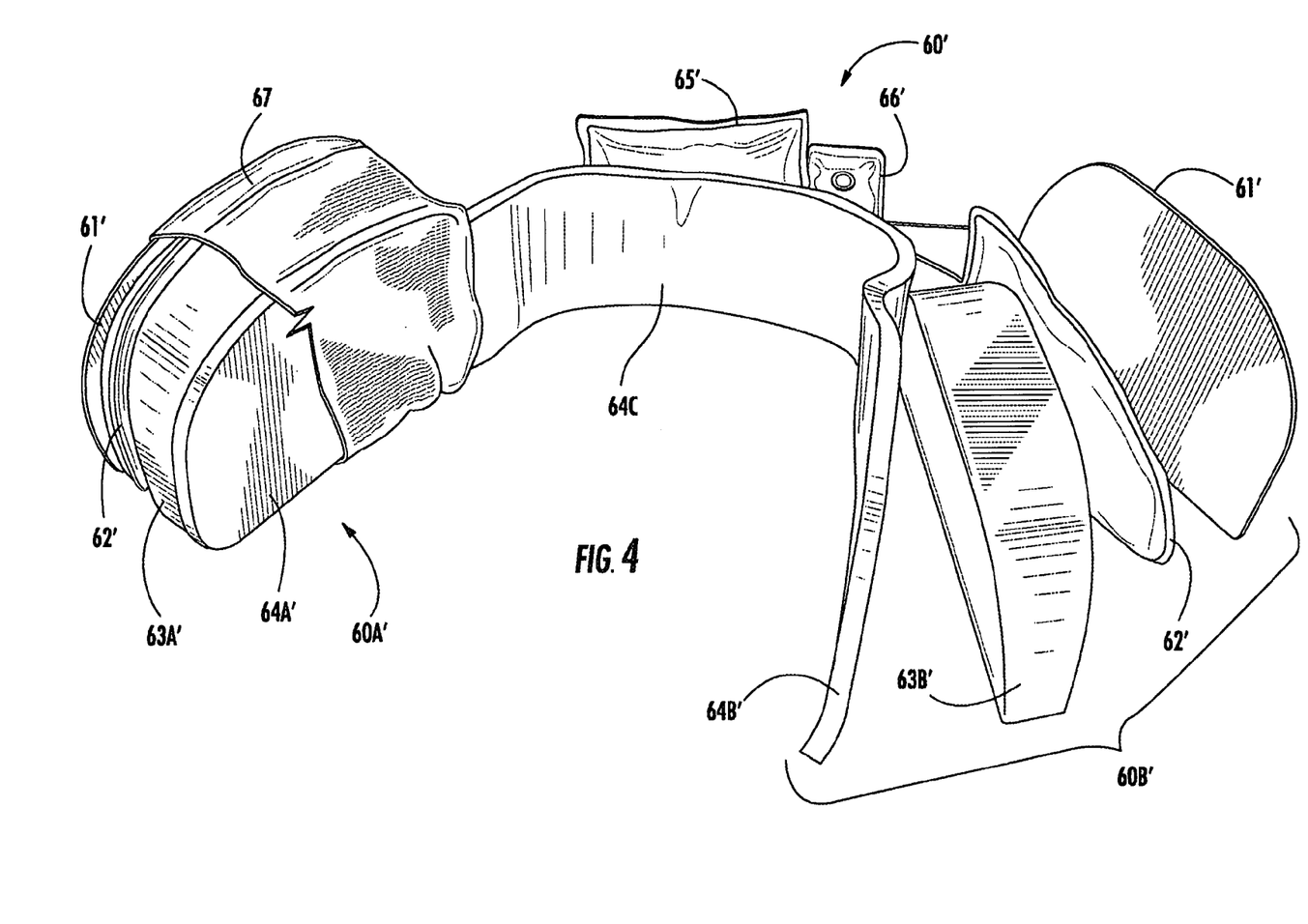
FIG. 4 is a front, partially exploded view, with parts broken away, of an alternative restraint assembly.

The air bladder 62 includes a small hand pump 65 with which to inflate the air bladder 62. A release valve 66 allows the user to release air from the air bladder 62 when desired. Thus, the total width "W" allowed for a child's head may be varied as desired within a large range, for example, from about 10 cm (4 in.) to about 20 cm (8 in.). In the illustrated example the width W may be varied from about 12.7 cm (5 in.) to about 16.5 cm (6½ in.) These components are assembled as shown and preferably placed in retaining bags 67, one of which is shown in FIG. 4. The bags 67 are preferably lightweight, breathable and launderable cloth.

By continued reference to FIG. 4, an alternative pad assembly 60' is shown, elements in common with the pad assembly 60 being shown in prime reference numerals. The comfort foam blocks 64A, 64B are formed as part of a single continuous foam layer 64C extending from one side of the pad assembly 60' to the other, as shown in FIG. 4.

Figure 5:
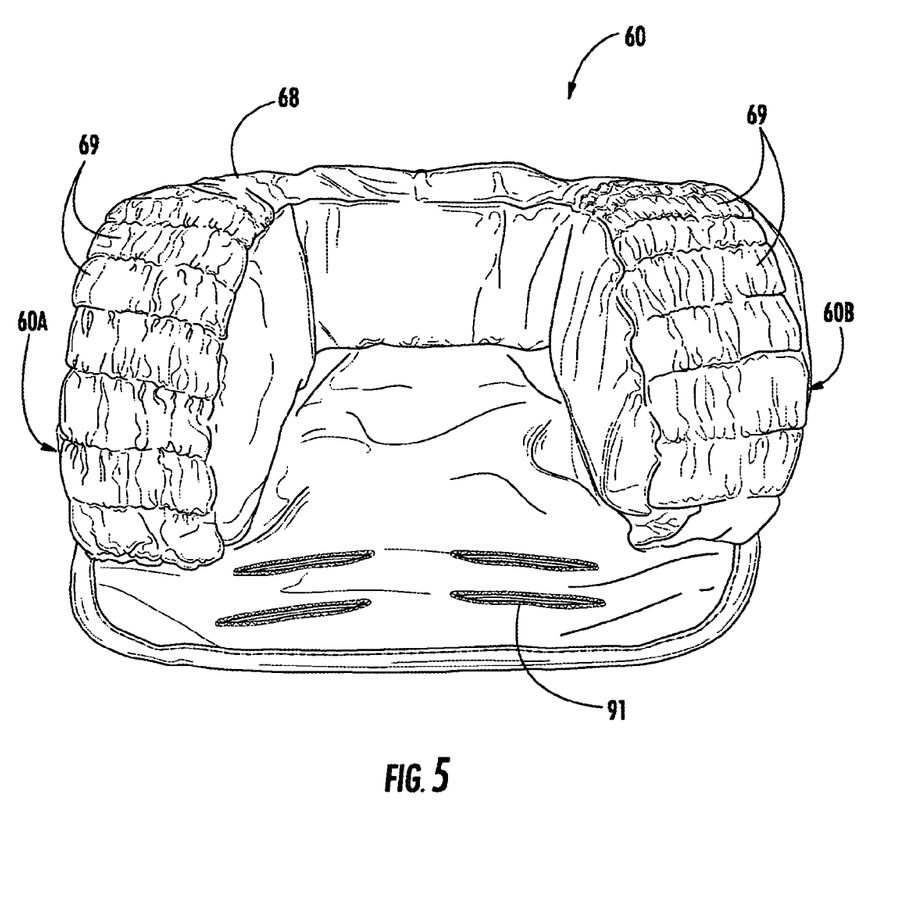
FIG. 5 is a front view of a fully assembled restraint assembly according to FIGS. 1–4.
Figure 6:
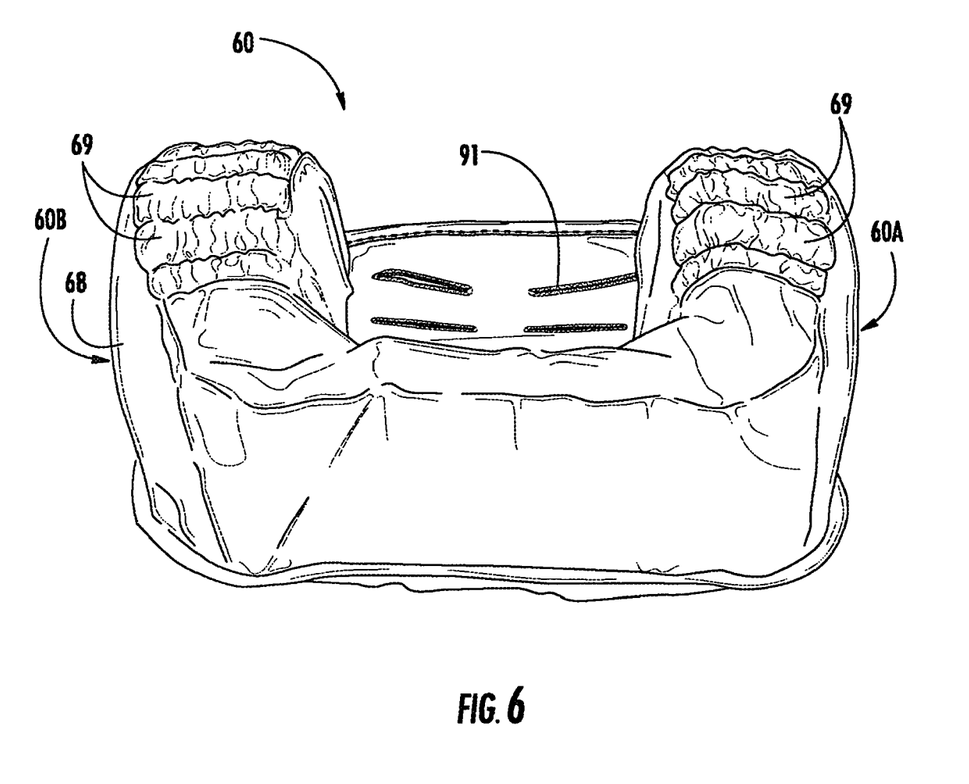
FIG. 6 is a rear view of the fully assembled restraint assembly shown FIG. 5.

As is shown in FIGS. 5 and 6, the entire pad assembly 60 is then placed in a cover 68. The entire assembly 60 is releasably attached to the seat back 14 in the same lateral plane as the infant's head, as shown FIGS. 1 and 2, for example, by using straps (not shown) threaded through slots 91 formed in the pad assembly 60.

According to one embodiment of the invention, the cover 68 includes laterally-extending gathers 69 across the top of the head pads 60A and 60B. The gathers 69 assert sufficient lateral compression against the air bladder 62 to assist deflation when the release valve 66 is operated.

In the preferred embodiments of the invention described above, the connector bridge 61 is fabricated of plastic sheet material approximately 1.6 mm (1/16 in.) thick. The air bladder 62 has a fully deflated thickness of approximately 1.6 mm (1/16 in.) and a fully inflated thickness of approximately 22 mm (7/8 in.) The crushable energy-absorbing foam blocks 63A and 63B may be constructed from dense polystyrene foam and has a thickness of approximately 38 mm (1.5 in.) at the top edge and approximately 22 mm (7/8 in.) at the bottom edge. The taper thus formed permits a closer conformation of the pad assembly 60 with the relatively wide cranium and the relatively narrower jaw and neck regions.

The comfort foam layer 64C and blocks 64A and 64B in FIG. 3 is constructed from softer, open-cell foam and is approximately 6.4 mm (1/4 in.) thick when in its uncompressed state.

Figure 7:
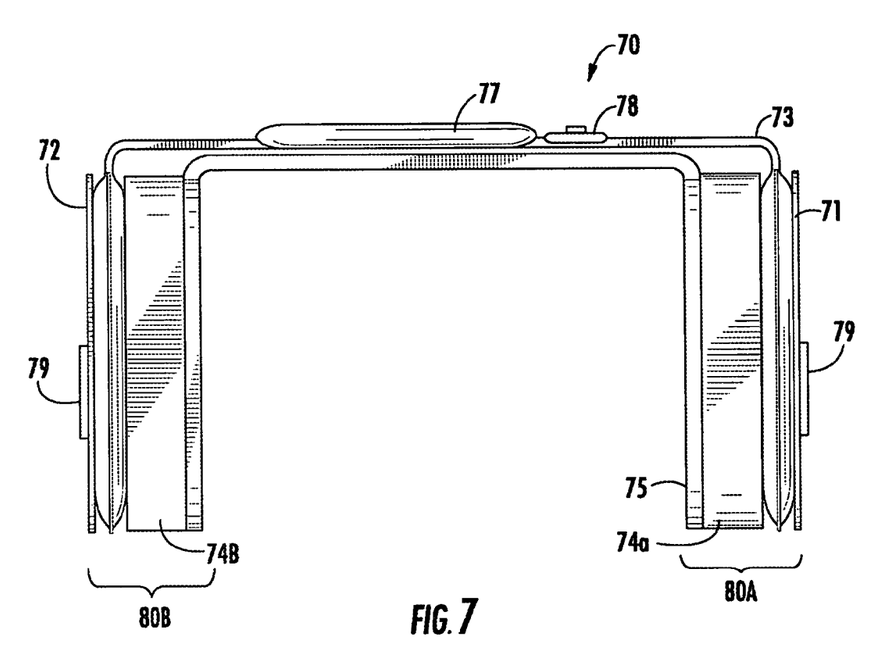
FIG. 7 is a top plan view of an alternative embodiment of a restraint assembly.
Figure 8:
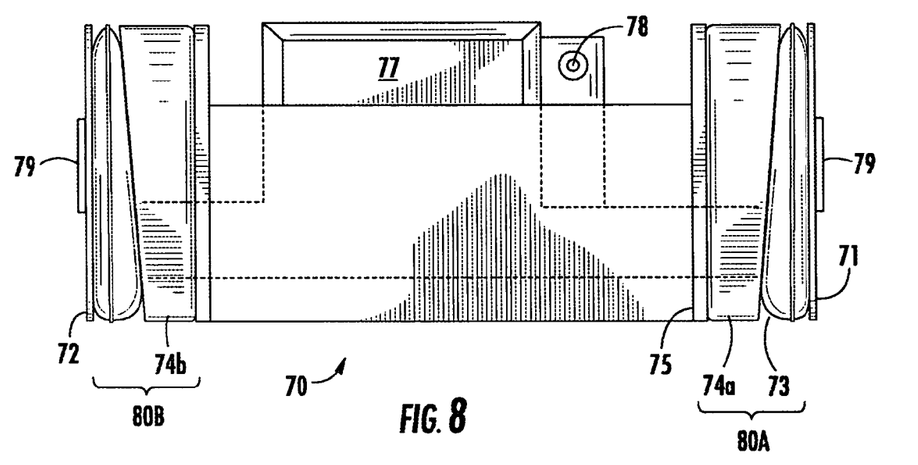
FIG. 8 is a front elevation of the embodiment shown in FIG. 7.

Referring now to FIGS. 7 and 8, an alternative embodiment of the lateral head restraint assembly is disclosed at reference numeral 70, and comprises a pair of stiff plastic supports 71, 72, an air bladder 73, wedge-shaped blocks of crushable, energy-absorbing foam 74A and 74B, and a layer of comfort foam 75 that extends in a U-shaped configuration completely around the interior of the restraint assembly 70.

The air bladder 73 includes a hand pump 77 with which to inflate the air bladder 73, and a release valve 78 to release air when desired.

These components are assembled as shown and preferably placed in retaining bags, not shown, but constructed as in FIG. 4 at reference numeral 67. The entire assembly 70 is then placed in a cover such as shown in FIG. 5 at reference numeral 68. The pad assembly 70 thus provides two opposed lateral head pads 80A and 80B. The entire assembly 70 is releasably attached to the seat back 14 in the same lateral plane as the infant's head, in the same manner as shown in FIGS. 1 and 2. One preferred attachment means is by touch and close fastener elements 79 that releasably cooperate with complementary touch and close fastener elements, not shown, attached to the cover 50 at the proper attachment point in general lateral alignment with the anticipated position of the head of the seat occupant. One example of such touch and close fastener elements are sold under the trademark VELCRO® and comprise complementary patches of hooks and loops.

Figure 9:
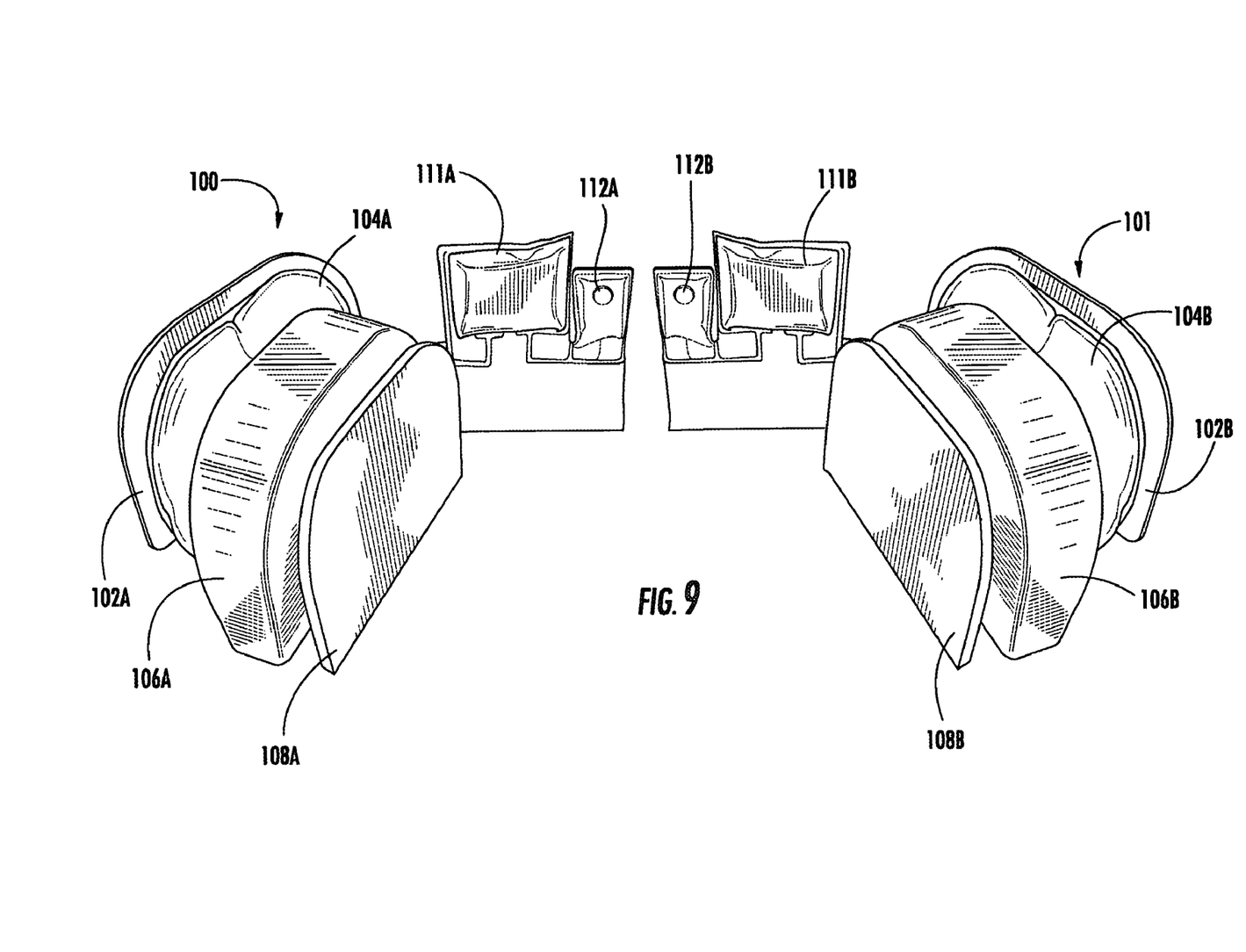
FIG. 9 is a front perspective view of a further embodiment of the restraint assembly, each pad being provided with an individual air bladder.

Referring now to FIG. 9, a pair of head restraint pads 100 and 101 are shown. The restraint pads 100 and 101 comprise, respectively, stiff, thin plastic supports 102A, 102B, overlaid air bladders 104A, 104B, and wedge-shaped blocks of crushable, energy-absorbing foam blocks 106A and 106B. Relatively thin blocks of a comfort foam 108A, 108B are disposed next to the blocks 106A, 108B, respectively. The restraint pads 101, 102 are preferably enclosed within a fabric bag as shown in FIG. 4 with reference to bag 67, and then are enclosed within a cover as shown in FIG. 5 with reference to cover 68.

A pair of air bladders 110A, 110B with respectively hand pumps 111A, 111B with which to inflate the air bladder 110A, 110B. Release valves 112A, 112B allow the user to individually release air from either or both air bladders 104A, 104B.

The restraint pads 101, 102 are thus individually attached to opposing side walls 16 and 18 of the seat back 14 and releasably held in place with, for example, complementary patches of hook and loop fastener material.

A restraint pad, restraint pad assembly and child safety seat are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A side-protective head restraint pad comprising:
   (a) an air bladder, including a pump for selectively inflating the air bladder and a release valve for selectively deflating the air bladder;
   (b) an energy-absorbing component;
   (c) a comfort component;
   (d) the air bladder, energy-absorbing component and comfort component being positioned in overlaid configuration to define a unit;
   (e) the head restraint pad adapted for being placed in a seat in lateral alignment with one side of the head of an occupant and inflatable or deflatable as appropriate to restrain the head against injurious lateral movement caused by a side impact relative to the seat; and
   (f) a flexible container within which the energy-absorbing component is positioned, the energy-absorbing component being sandwiched between the air bladder and the comfort component, and a comfort component side of the head restraint pad being adapted for being placed adjacent the head of an occupant.

2. A side-protective head restraint pad comprising:
   (a) an air bladder, including a pump for selectively inflating the air bladder and a release valve for selectively deflating the air bladder;
   (b) an energy-absorbing component;
   (c) a comfort component;
   (d) wherein the energy-absorbing component is sandwiched between the air bladder and the comfort component; and
   (e) the head restraint pad adapted for being placed in a seat in lateral alignment with one side of the head of an occupant and inflatable or deflatable as appropriate to restrain the head against injurious lateral movement caused by a side impact relative to the seat, wherein a comfort component side of the head restraint pad is adapted for being placed in a seat adjacent one side of the head of an occupant, and further wherein the energy absorbing component is formed of semi-rigid, compressible foam and the comfort component is formed of a soft, compressible foam.

3. A side-protective head restraint pad comprising:
   (a) an air bladder, including a pump for selectively inflating the air bladder and a release valve for selectively deflating the air bladder;
   (b) an energy-absorbing component;
   (c) a comfort component;
   (d) the air bladder, energy-absorbing component and comfort component being positioned in overlaid configuration to define a unit;
   (e) the head restraint pad adapted for being placed in a seat in lateral alignment with one side of the head of an occupant and inflatable or deflatable as appropriate to restrain the head against injurious lateral movement caused by a side impact relative to the seat, wherein the pad includes a stiff support positioned on a side of the air bladder remote from the energy-absorbing component for providing shaping and support to the restraint pad.

4. A head restraint assembly comprising:
(a) an air bladder, including a pump for selectively inflating the air bladder and a release valve for selectively deflating the air bladder;
(b) an energy-absorbing component;
(c) a comfort component; and
(d) retention means for retaining the air bladder, energy-absorbing component and comfort component in an overlaid configuration relative to each other to define a unit;
(e) the air bladder, energy-absorbing component and comfort component and enclosure collectively defining a pair of head restraining pads for being positioned in a generally U-shaped configuration in a seat with the pair of head restraining pads adjacent opposing sides of the head of the seat occupant, and selectively inflatable and deflatable as appropriate to restrain the head against injurious lateral movement caused by a side impact relative to the seat, wherein the energy-absorbing component is sandwiched between the air bladder and the comfort component, and the comfort component is adapted for being placed nearest the head of the seat occupant.

5. A head restraint assembly according to claim 4, wherein the energy absorbing component is formed of semi-rigid, compressible foam; the comfort component is formed of a soft, compressible foam; and the retention means comprises an enclosure formed of a fabric.

6. A head restraint assembly according to claim 4, wherein the semi-rigid energy-absorbing component comprises a pair of foam blocks.

7. A head restraint assembly according to claim 6, wherein the foam blocks are downwardly-tapered to provide a head restraint assembly that is relatively thick adjacent a cranial portion of the head and relatively less thick adjacent the jaw portion of the head.

8. A child safety seat with an adjustable head restraint, comprising:
(a) a shell defining a generally rigid, concave integral seat bottom and seat back;
(b) seat padding covering the seat bottom and seat back for providing a comfortable seating surface for a seat occupant;
(c) attachment means carried by the shell for attachment of the shell to a support; and
(d) a side-protective head restraint assembly, comprising:
(i) an air bladder, including a pump for selectively inflating the air bladder and a release valve for selectively deflating the air bladder;
(ii) a semi-rigid energy-absorbing component comprising a pair of foam blocks;
(iii) a comfort component;
(iv) a flexible enclosure within which the air bladder, energy-absorbing component and comfort component are positioned in overlaid configuration to define a unit;
(v) the air bladder, energy-absorbing component and comfort component and flexible enclosure collectively defining a pair of head restraining pads for being positioned in a generally U-shaped configuration on the seat back with the pair of head restraining pads adjacent opposing sides of the head of the seat occupant, and selectively inflatable and deflatable to restrain injurious lateral movement of the head of the seat occupant caused by a side impact relative to the seat.

9. A safety seat according to claim 8, wherein the energy absorbing component is formed of semi-rigid, compressible foam; the comfort component is formed of a soft, compressible foam; and the enclosure is formed of a fabric.

10. A safety seat according to claim 8, wherein the pad includes a stiff support positioned on a side of the air bladder remote from the energy-absorbing component for providing shaping and support to the restraint pad.

11. A safety seat according to claim 8, and including an attachment component carried by the pad for attaching the pad to the seat back.

12. A side-protective head restraint pad, comprising:
(a) an air bladder, including a pump for selectively inflating the air bladder and a release valve for selectively deflating the air bladder;
(b) an energy-absorbing component comprising at least one semi-rigid compressible foam block;
(c) a comfort component comprising an open cell foam;
(d) a flexible enclosure within which the air bladder, energy-absorbing component and comfort component are positioned in overlaid configuration to define a unit; and
(e) wherein the head restraint pad is adapted for being placed in a seat in lateral alignment with one side of the head of an occupant and inflatable or deflatable as appropriate to restrain the head against injurious lateral movement caused by a side impact relative to the seat.

13. A head restraint pad according to claim 12, wherein the pad includes a stiff support positioned on a side of the air bladder remote from the energy-absorbing component for providing shaping and support to the restraint pad.

14. A head restraint pad according to claim 12, and including an attachment component carried by the pad for attaching the pad to the seat.

15. A head restraint pad according to claim 12, wherein the energy-absorbing component is sandwiched between the air bladder and the comfort component, and the comfort component is adapted for being placed nearest the head of the seat occupant.

16. A side-protective head restraint pad, according to claim 12, wherein the energy absorbing component comprises polystyrene foam.

* * * * *